(12) United States Patent
D'Alessandro et al.

(10) Patent No.: US 7,925,124 B2
(45) Date of Patent: Apr. 12, 2011

(54) ELECTRO-OPTICAL TUNABLE FILTER AND MANUFACTURING PROCESS

(75) Inventors: Antonio D'Alessandro, Rome (IT); Romeo Beccherelli, Rome (IT); Cesare Umeton, Rende (IT); Rita Asquini, Rome (IT); Domenico Donisi, Rome (IT); Luciano De Sio, Rende (IT); Roberto Caputo, Rende (IT)

(73) Assignees: Universita Della Calabria, Rende (IT); Universita Degli Studi Di Roma "La Sapienza", Rome (IT); CNR Consiglio Nazionale Delle Ricerche, Rome (IT)

( * ) Notice: Subject to any disclaimer, the term of this patent is extended or adjusted under 35 U.S.C. 154(b) by 8 days.

(21) Appl. No.: 12/487,077

(22) Filed: Jun. 18, 2009

(65) Prior Publication Data

US 2009/0317032 A1 Dec. 24, 2009

Related U.S. Application Data

(63) Continuation of application No. PCT/IT2007/000878, filed on Dec. 17, 2007.

(51) Int. Cl.
*G02F 1/1334* (2006.01)
*G02F 1/13* (2006.01)
*H01L 21/00* (2006.01)

(52) U.S. Cl. ............. 385/2; 385/37; 385/131; 349/187; 349/201; 438/30; 438/31

(58) Field of Classification Search .................. 385/1, 2, 385/3, 8, 9, 10, 42, 40, 39, 37, 14, 129, 130, 385/131, 132, 11; 438/20, 30, 31; 349/187, 349/201
See application file for complete search history.

(56) References Cited

U.S. PATENT DOCUMENTS

| 5,986,740 | A | * | 11/1999 | Robinson et al. | ............. 349/201 |
|---|---|---|---|---|---|
| 6,201,589 | B1 | * | 3/2001 | Tombling et al. | ............. 349/141 |
| 6,373,549 | B1 | * | 4/2002 | Tombling et al. | ............. 349/201 |
| 6,768,824 | B2 | * | 7/2004 | Ramachandran | ............. 385/11 |
| 6,821,457 | B1 | * | 11/2004 | Natarajan et al. | ............. 252/582 |
| 7,420,733 | B1 | * | 9/2008 | Natarajan et al. | ............. 359/566 |
| 2006/0018597 | A1 | * | 1/2006 | Piede et al. | ............. 385/39 |
| 2009/0317032 | A1 | * | 12/2009 | D'Alessandro et al. | ............. 385/2 |

* cited by examiner

*Primary Examiner* — Brian M Healy
(74) *Attorney, Agent, or Firm* — Ronald E. Smith; Smith & Hopen, P.A.

(57) ABSTRACT

An electro-optical filter made of a support in which an optical guide with a diffused channel waveguide and of a cover, that are created in borosilicate glass, and which includes a gap obtained by the use of suitable spacers, filled with a grating constituted of alternating strips of polymer and liquid crystal called POLICRYPS (Polymer Liquid CRYstal Polymer Slices), and with first electrodes that are coplanar to the support and next to the optical guide with a channel, that electrically control the grating making the filter tunable, and a manufacturing process.

9 Claims, 4 Drawing Sheets

ELECTRO-OPTICAL TUNABLE FILTER AND MANUFACTURING PROCESS

CROSS REFERENCE TO RELATED APPLICATIONS

This application is a continuation of PCT Application No. PCT/IT2007/000878, filed Dec. 17, 2007, which claims benefit of Italian Application No. CS2006A000019, filed Dec. 18, 2006.

TECHNICAL FIELD OF INVENTION

The invention regards an electro-optical tunable filter with a polymer and a liquid crystal grating and a manufacturing process for the creation of an optoelectronic component with low power consumption for switching and filtering confined optical signals.

STATE OF THE ART

Waveguided tunable optical filters created by means of different technologies exist on the market. The most commercially diffused optical filters are fibre Fabry-Perot cavity filters, acousto-optical filters of lithium niobate, thermo-optical filters based on Mach-Zehnder interferometers which are tunable by means of thermo-optical effect on silicon.

One significant disadvantage consists in the absence of zeros in the function of optical transmission, which causes inter-channel crosstalk since it is not possible to suppress the out-of-band optical channels.

Another limitation consists in the limited speed of the tuning mechanism, based on the piezoelectric effect, which has response times that are longer than several milliseconds. Acoustic-optic filters on lithium-niobate and optical filters based on Mach-Zender interferometers made by silicon oxide on silicon technology have both higher manufacturing costs and far greater power consumption than optical filters which are the object of the present invention.

Other characteristics and advantages of the invention will appear from the following description of a technique of creating the invention given as a non-limiting example in the figures and by the description of the chosen illustrations that follow.

SYNTHETIC DESCRIPTION OF THE FIGURES

Figure 1:
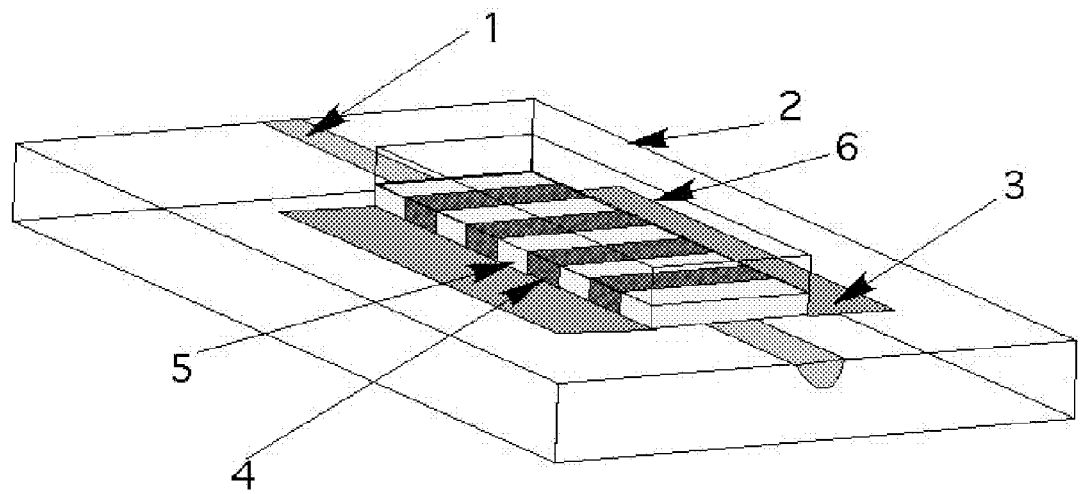

FIG. 1: The figure is a schematic representation of the electro-optical tunable filter object of the present invention in a first preferred embodiment.

Figure 2A:
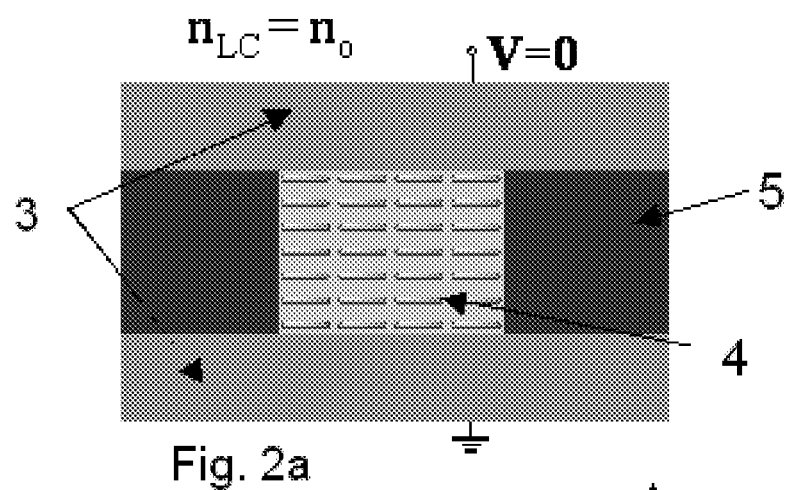

FIG. 2a: The figure is a schematization of the POLICRYPS structure seen from above with the orientation of the liquid crystal molecules (a) in the absence of voltage applied to the electrodes.

Figure 2B:
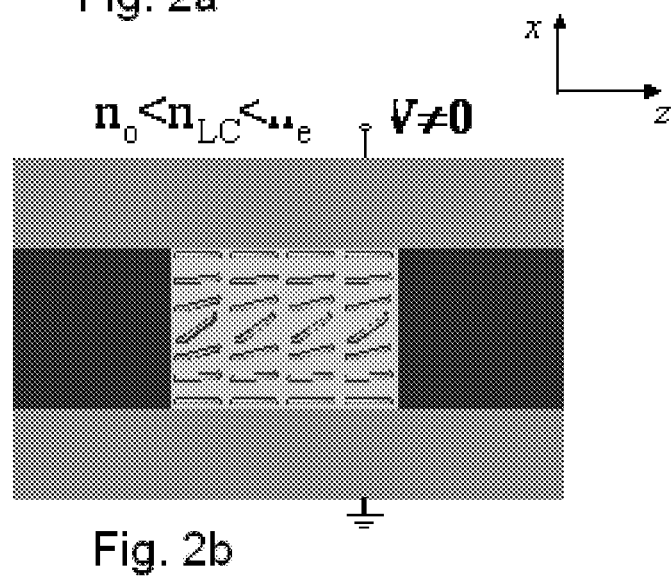

FIG. 2b: The figure is a schematization of the POLICRYPS structure seen from above with the orientation of the liquid crystal molecules (b) in the presence of voltage applied to the electrodes.

Figure 3:
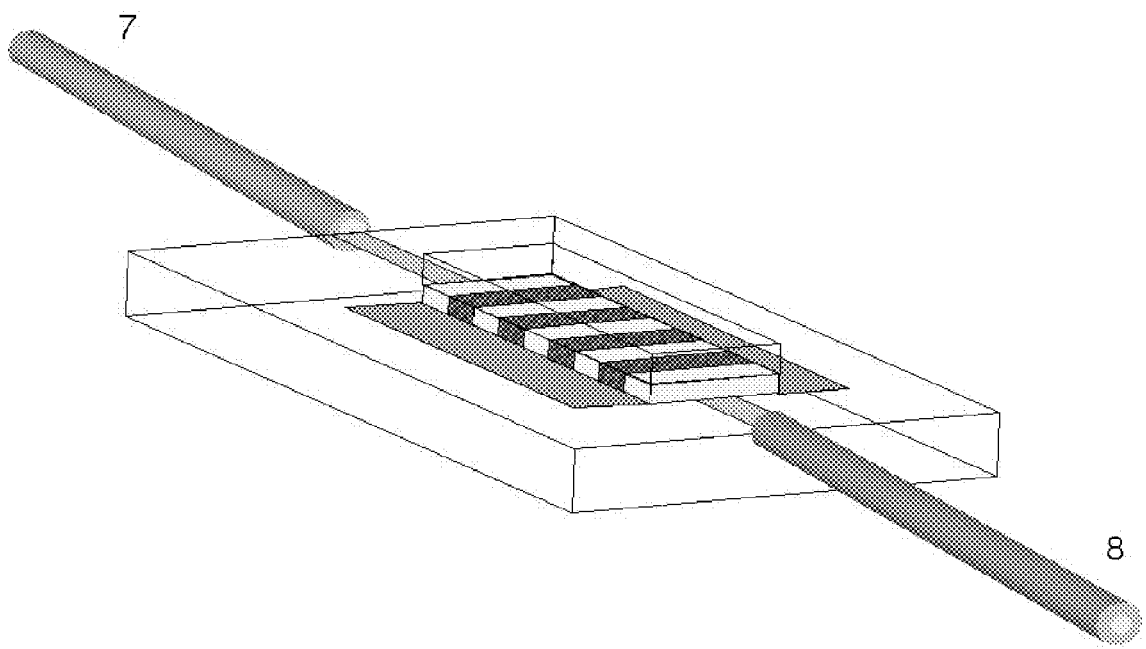

FIG. 3: The figure represents an electro-optical tunable filter with optical fibers coupled to the input and to the output of the channel guides.

Figure 4:
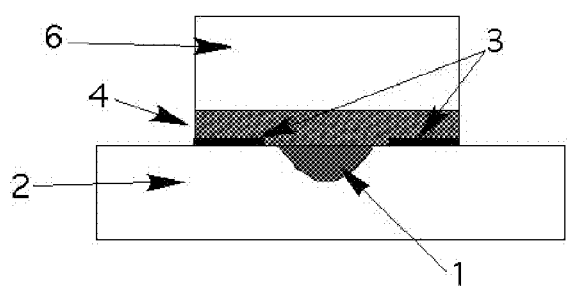

FIG. 4: The figure is a schematic representation of the section perpendicular to the channel waveguide of the electro-optical tunable filter object of the invention in a first preferred embodiment.

Figure 5:
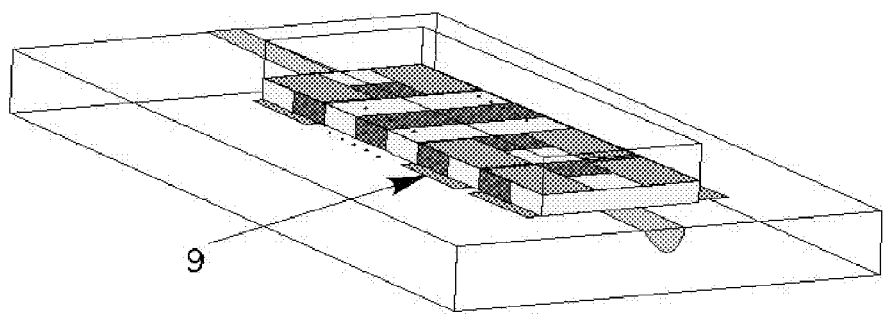

FIG. 5: The figure is a schematic representation of the electro-optical tunable filter object of the present invention in a second preferred embodiment. The dotted lines represent further electrodes that are not explicitly shown.

Figure 6:
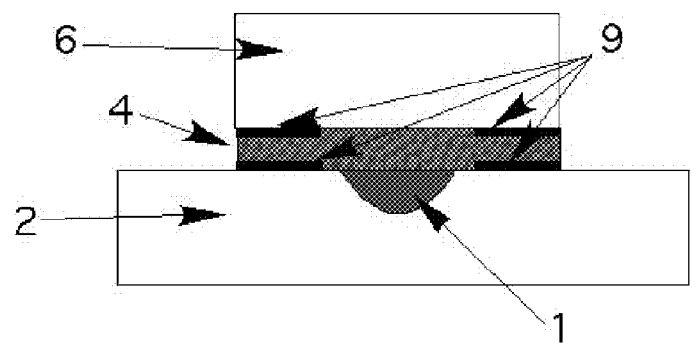

FIG. 6: The figure is a schematic representation of the section perpendicular to the channel waveguide of the electro-optical tunable filter object of the invention in a second preferred embodiment.

Figure 7:
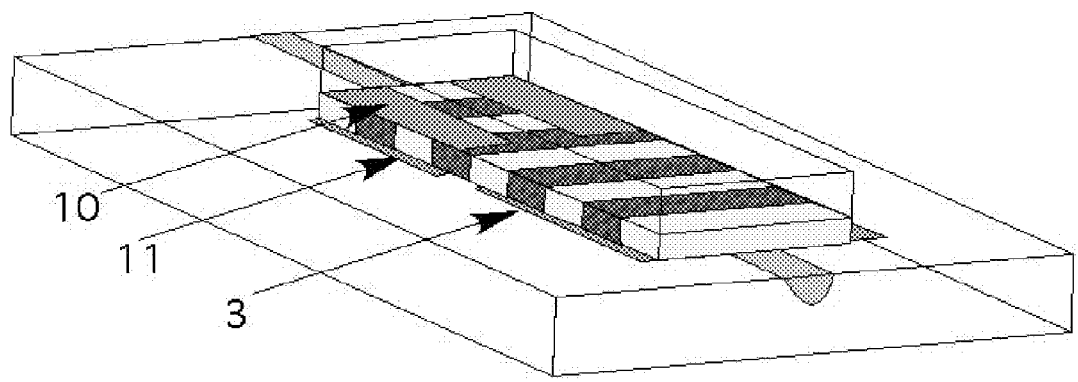

FIG. 7: The figure is a schematic representation of the electro-optical tunable filter object of the invention in a third preferred embodiment.

Figure 8:
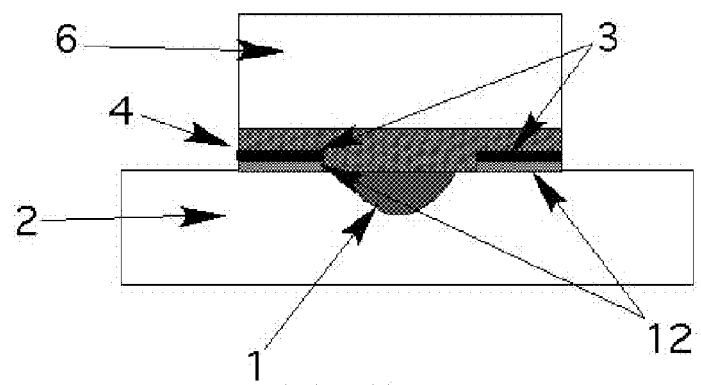

FIG. 8: The figure is a schematic representation of the section perpendicular to the channel waveguide of the electro-optical tunable filter object of the invention in a fifth preferred embodiment.

Figure 9:
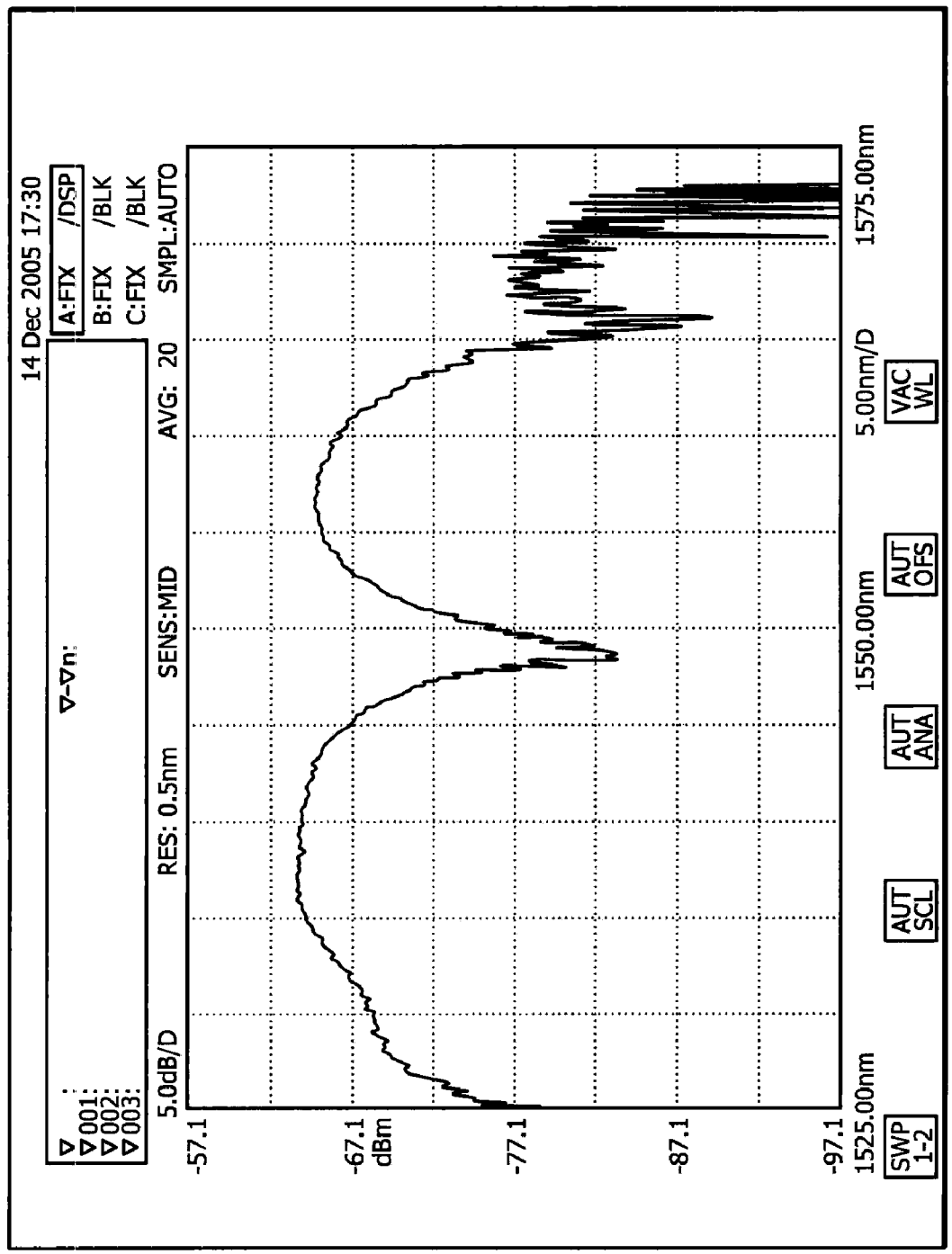

FIG. 9: The figure represents the optical response of the electro-optical tunable filter measured by the optical spectrum analyzer with no applied voltage.

DESCRIPTION OF PREFERRED EMBODIMENTS OF THE INVENTION

First Preferred Embodiment

With reference to FIG. 1, the filter object of the present invention consists of a diffused channel waveguide 1, obtained by the double ionic exchange in a support consisting of a substrate of borosilicate glass BK7 2, covered by a holographic phase grating that is electronically controllable by coplanar electrodes 3 placed along the waveguide.

The grating is constituted by alternating strips of liquid crystal 4 and polymer 5 and is therefore denominated as POLICRYPS (POlymer LIquid CRYstal Polymer Slices). The grating fills a gap formed by the borosilicate glass support 2 and by a second glass 6 which is also of borosilicate BK7.

The glass BK7 is a borosilicate glass with excellent optical, chemical (resistant to acid attacks) and physical properties. It is known by this trade name commercially throughout the glassmaking industry. The trade name is a registered trademark. It is widely used in the field of optics for lenses, prisms, laser cavities.

The optical guides in BK7 are particularly interesting because they have low loss levels (less than 1 dB/cm) and can be created with a high uniformity over a large area through a simple, low cost technological process.

The structure of the grating is obtained through the writing technique described in the patent application IT-A-TO2003A000530 beginning with a mixture of pre-polymer and liquid crystal. The pre-polymer is a commercially available photo-sensitive glue (NOA 61 by Norland), that polymerizes when exposed to ultraviolet light. The liquid crystal used is a nematic liquid crystal commercially indicated by the name 5CB.

Other mixtures constituted of other combinations of photo-sensitive pre-polymers can, however, be identified by experts skilled in the art and used to improve the performances of the component.

The mixture placed between two glasses, one of which contains the waveguide, is exposed to a figure of interference, with a suitable cycle, between two laser beams with a wavelength of 352 nm.

The polymer and the liquid crystal are chosen in such a way that the index of refraction of the polymer is intermediate between the two indexes (ordinary and extraordinary) of the liquid crystal that is an optically anisotropic material. A beam of light confined within the guide "sees" a modulation of the index of refraction in the layer of POLICRYPS above it.

The modulation of the refraction index of the layer of the POLICRYPS produces an optical filtering action on the light that propagates in the waveguide. In fact, according to Bragg's law said to be Λ a period of the grating, N the effective index of refraction of the guided method and m an integer that represents the level of diffraction, the light at the wavelength $\lambda_B=2N\Lambda/m$ is reflected backwards and is not transmitted to the output of the waveguide.

The ordinary index of refraction of the liquid crystal holds for a light substantially polarized perpendicular to the liquid crystal molecules, in the form of rods, while the extraordinary index is valid for light substantially polarized along the longitudinal axis (director) of the molecules.

At rest, the liquid crystal molecules 4 are aligned perpendicular to the strips of polymer 5, as shown in FIG. 2, therefore the modulation of the index of refraction of the grating is the same whatever the polarization of the incoming light with respect to the waveguide. In such a way the operation of the optical filter is polarization independent.

By applying an electric field for the electro-optical effect the liquid crystal molecules undergo a re-orientation, therefore the light that travels in the waveguide "sees" a modified refractive index modulation of the grating. In such a way the back-reflected wavelengths change with the variation of the voltage applied.

The filter is therefore tunable and can also be turned off at the voltage at which the re-orientation of the liquid crystal molecules is such that the index of refraction of the liquid crystal is equals to the refraction index of the polymer.

In the case of re-orientation of the molecules only the light which is almost TE polarized, along the horizontal direction x (see FIGS. 2a and 2b) and perpendicular to the direction of propagation feels the variation of the index of the liquid crystal.

The electro-optical tunable filter object of the present invention is a compact technological solution to resolve the problem of the selection of channels of light that travel in optical fibers. Furthermore, the configuration of the filter can be efficiently and effectively interfaced with conventional fiber optics, as shown in FIG. 3, and is created with relatively simple technology, and that are reliable, repeatable and above all with lower costs with respect to the state of the art.

The optical channel waveguide is obtained by the double ion-exchange technique, K+/Na+ and Ag+/Na+ in a fused saline bath. To obtain the first ionic exchange, K+/Na+, the support in borosilicate glass BK7 is immersed in a first saline bath of potassium nitrate at a temperature of between 380° C. and 450° C. for 60-90 mins.

A slight increase of the index of refraction on the surface of the glass is thus obtained. Then the definition of a mask, which can be in aluminium, for example, follows deposited by vacuum evaporation and photolithographically defined in such a way as to present openings that expose parts of the surface of the substratum of BK7 that correspond to the optical channels with a width of 6-8 μm.

These channels are obtained by a second exchange Ag+/Na+ immerging the support of borosilicate glass BK7 in a second saline bath constituted by a mixture of sodium nitrate and silver nitrate at a temperature between 320° C. and 350° C. for 4.5-6 hours.

Thanks to the presence of the aluminium mask, the second ion exchange produces an increase of the index of refraction of the surface of the glass only in the area defined by the openings of the aluminium mask.

Through a second photolithographic process and a further etching of the aluminium, it is partially removed so as to leave coplanar electrodes for the application of the voltage. The borosilicate glass BK7 then undergoes another heating for 12-24 hours at a temperature of between 320° C. and 350° C. equals to that of the second exchange to attenuate the optical loss caused by silver colloids present in the channel.

A second borosilicate glass BK7 6, that acts as a cover, is glued to the support of borosilicate glass containing the optical guide in such a way as to obtain a gap of a few microns through the use of suitable spacers.

The mixture of liquid crystal and pre-polymer successively fills the gap to create the grating. After writing the grating, already previously mentioned, the end faces of the sample are lapped and polished to allow for coupling with the input optical fiber 7 and output fiber 8 as shown in FIG. 3. FIG. 4 schematically shows the transverse section of the filter in the presence of the electrodes 3 and the liquid crystal 4.

Second Preferred Embodiment

In a second preferred embodiment, a variety of sets of four electrodes 9 are created in order to independently apply different voltages in order to control different areas of the grating, each being characterized by its own suitable extension along the axis of propagation, as shown in FIG. 5 and in FIG. 6 representing a transversal section that includes the set of four electrodes and the liquid crystal. This allows for the creation of a variety of zeros in the optical transmission at the wavelengths $\lambda_{Bi}=2N_i\Lambda/m$, where $N_i$ is the effective index of the mode in the i-th area.

Third Preferred Embodiment

In a third preferred embodiment the polarization independence of the operation of the first construction is obtained by adding a second stage of the filter in which an electrical field that is perpendicular to the substrate is applied, as proposed in US-A-2004/0202398. This is achieved by using a further set of four electrodes constituted by two electrodes 10 placed on the internal face of the second glass 6, acts as a cover, and aligned with the electrodes 11 on the substrate containing the waveguide, as shown in FIG. 7.

By applying an electric field between the top electrodes 10 and bottom electrodes 11 of this set of four electrodes, the molecules of liquid crystal will tend to align along the field and the index modulation of the grating will be "perceived" by a quasi-TM polarized light beam along the applied electric field. The combination of the control operated by the electrodes 3, 10 and 11 allows a substantial extinction of the transmission at a wavelength of $\lambda_B$ for each polarization.

Fourth Preferred Embodiment

By suitably combining what has been described for the second and the third embodiment, a fourth preferred embodiment is obtained in which the independence of the polarization for a variety of zeros in the optical transmission is obtained. This is obtained through a greater number of electrodes created both on the support and on the cover.

Fifth Preferred Embodiment

In a fifth embodiment a better symmetry of the applied electrical field with respect to the first embodiment is obtained by the positioning of the electrodes on suitable spacers 12 as shown in FIG. 8 in order to improve the uniformity of the electrical field, increase the fraction of molecules that re-orientate and the entity of said re-orientation in order to increase the effect of modulation of the effective index of refraction for the quasi-TE polarization.

Furthermore, for a suitable density of the electrodes, field lines that start directly from the vertical edges of the electrodes can be obtained, thus further improving the uniformity of the re-orientation of the liquid crystal molecules.

Other Embodiments

It is understood that the quasi-TE polarization can also be controlled by a further pair of electrodes placed on the cover and substantially aligned with the electrodes described in the first and third preferred embodiments.

It is understood that in the configuration of multiple pairs of electrodes in the second preferred embodiment (FIG. 5), and in the configuration of sets of six electrodes in the fourth embodiment (FIG. 7) and as in other configurations with other variations and extensions of the fifth preferred embodiment having multiple pairs of electrodes and not explicitly illustrated, corresponding to each single pair or to a set of six electrodes the gratings can have a different period, creating in this way a filter with zero multiples more efficiently.

It is also understood the possibility of constructing grating structures which allow the optimization of the spectral response of the electro-optical tunable filter by techniques of apodisation and chirping of the grating as in fiber Bragg gratings.

It is also understood that experts skilled in the art can identify different choices of materials (pre-polymers, liquid crystals, metals for masks, supports and covers) and of process (wavelength of polymerization, process of depositing the mask by sputtering instead of evaporation). It is also understood that for all the constructions the coupling with the optical fibers in input 7 and in output 8 as shown in FIG. 3 is foreseen.

Example of Experimental Response

A sample tested in a laboratory was fed by a wide band source. The source (based on a erbium doped fiber) emits signals in the C band of transmission of the optical fibers with wavelengths between 1525 and 1575 nm.

The sample worked correctly. This was demonstrated by the spectrum acquired by an optical spectrum analyzer and shown in FIG. 9.

The output spectrum in FIG. 9 was measured on a 11 mm long filter and shows a suppression of a band of approximately 2.5 nm about a wavelength of 1547 nm. This was predicted at the design stage for a period Λ of the grating of 2.53 μm. The suppression is of 20 dB for random input polarization.

What is claimed is:

1. Electro-optical tunable filter made of a support in which a diffused channel optical waveguide has been created in a glass support, preferably of the borosilicate type, and by a cover in glass, also preferably of the borosilicate type, characterised by the fact that said support and said cover have a gap between them obtained by using suitable spacers, that said gap is filled with a grating constituted of alternating strips of polymer and liquid crystal (POlymer LIquid CRYstal Polymer Slices) POLICRYPS, and that at least one pair of first electrodes, next to the channel optical waveguide, control the grating electrically.

2. Electro-optical tunable filter according to claim 1 characterised by the fact that the electrodes are coplanar to the support, or the cover, or both.

3. Electro-optical tunable filter according to claim 1 or 2 characterised by the fact that at least a further pair of second electrodes are created in the position of the support and of the cover, and are preferably substantially coplanar to the glass which is complementary to that of the first electrodes for the application of an electrical field perpendicular to the substrates.

4. Electro-optical tunable filter according to claim 3 characterised by the fact that a first pair of electrodes controls the quasi-TE polarisation of the light through an electrical field having a component on the surface where the support and the cover lie and substantially perpendicular to said direction of propagation and a second and third pair of electrodes control the quasi-TM polarisation by means of an electrical field having a component perpendicular to said surface and substantially perpendicular to said direction of propagation.

5. Electro-optical tunable filter according to claim 1 or 2 characterised by a variety of pairs of electrodes where said pairs of electrodes substantially independently control only that part of the grating that lies between them.

6. Electro-optical tunable filter according to claims 1 or 2, characterised by the fact that the extremities of the support containing the optical waveguide are coupled with input and output optical fibers.

7. Manufacturing process for a electro-optical tunable filter according to any of the previous claims characterised by the fact that the optical waveguide on a support of borosilicate glass is obtained through the technique of double ion-exchange, that a first ion-exchange K+/Na+, with a glass support immersed in a first saline bath of potassium nitrate, is carried out at a temperature of between 380° C. and 450° C. for a time of between 60 and 90 minutes, that a mask of metal, preferably aluminium, is deposited by vacuum evaporation on the glass support and defined photolithographically for the determination of the optical waveguide with a channel, that a second exchange Ag+/Na+ with the immersion of the glass support in a second saline bath constituted of a mixture of sodium nitrate and silver nitrate is carried out at a temperature of between 320° C. and 350° C. for a time of between 4.5 and 6 hours, that a second photolithographic process is carried out and then a subsequent etching of the metal that is partially removed in such a way as to leave coplanar electrodes for the application of the voltage, that a covering glass is glued to the support containing the optical waveguide, that suitable spacers are used in such a way as to obtain a gap of a few microns, that the gap is filled with a mixture of liquid crystal and pre-polymer for the creation of the grating, that the mixture of liquid crystal and pre-polymer is exposed to a figure of interference, for a suitable period, between two laser strips of a wavelength suitable to bring about the polymerisation of the pre-polymer.

8. Manufacturing process for a electro-optical tunable filter according to claim 7 characterised by the fact that the extremities of the support containing the optical waveguide are lapped and polished to permit their coupling with the input and output optical fibres.

9. Manufacturing process for a electro-optical tunable filter according to claims either 7 or 8 characterised by the fact that the two laser beams have a wavelength of between 320 and 380 nm, and preferably between 350 and 380 nm.

* * * * *